UNITED STATES PATENT OFFICE.

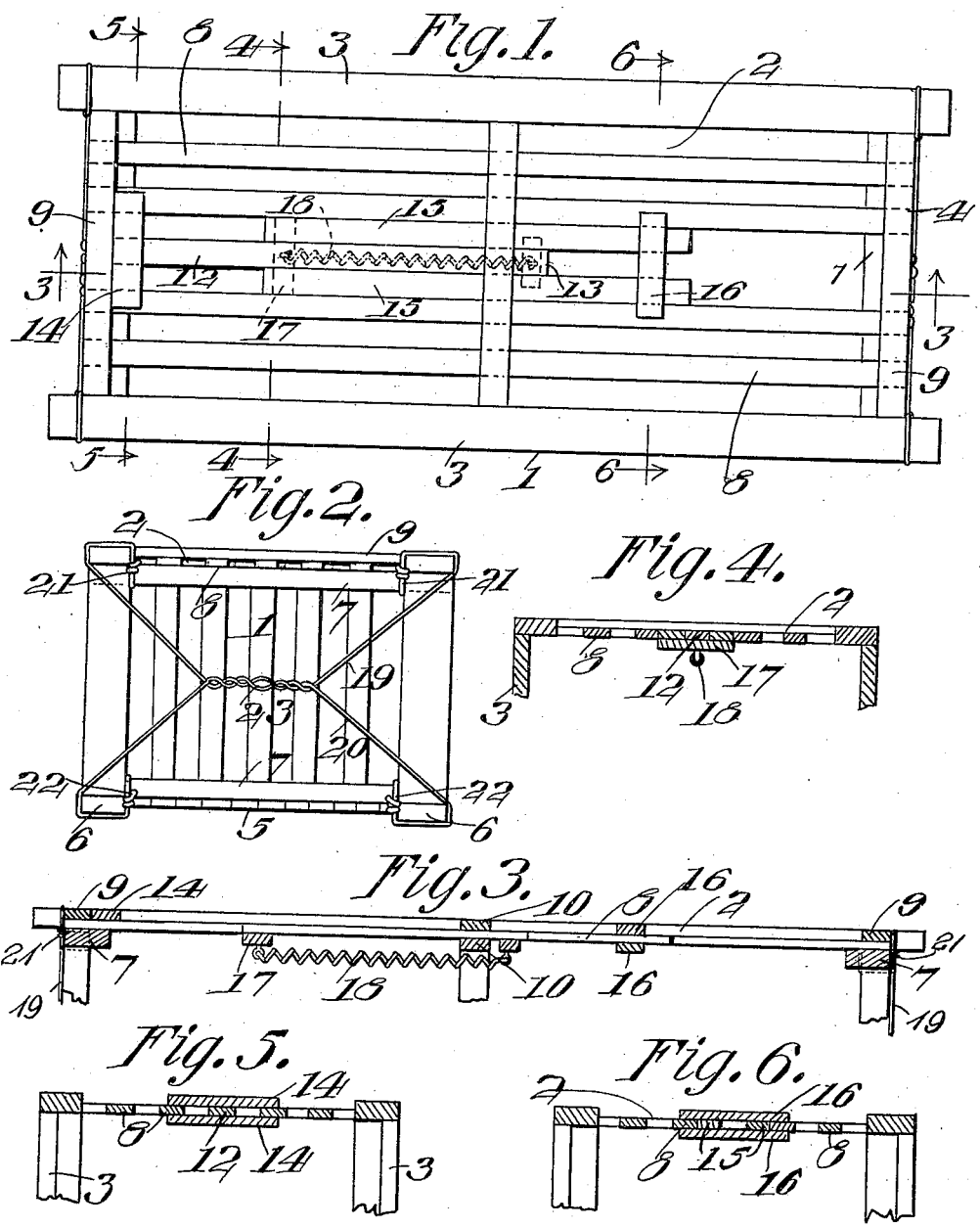

DANIEL TURNER, OF KINGFISHER, OKLAHOMA, ASSIGNOR, BY DIRECT AND MESNE ASSIGNMENTS, OF ONE-HALF TO C. H. HALLADAY, OF KINGFISHER, OKLAHOMA.

POULTRY-CRATE.

No. 914,323.   Specification of Letters Patent.   Patented March 2, 1909.

Application filed August 27, 1908. Serial No. 450,453.

*To all whom it may concern:*

Be it known that I, DANIEL TURNER, a citizen of the United States, residing at Kingfisher, in the county of Kingfisher and State of Oklahoma, have invented certain new and useful Improvements in Poultry-Crates; and I do declare the following to be a full, clear, and exact description of the invention, such as will enable others skilled in the art to which it appertains to make and use the same.

This invention relates to improvements in poultry crates.

The object of the invention is to provide a poultry crate having an improved construction of door adapted to be opened at either end of the crate and having means whereby when one end is opened, the other will be closed.

A further object is to provide an improved bracing mechanism whereby the sides of the crate are rigidly supported and braced.

With these and other objects in view, the invention consists of certain novel features of construction, combination and arrangement of parts as will be described and particularly pointed out in the appended claims.

In the accompanying drawings, Figure 1 is a top plan view of the crate constructed in accordance with the invention, one end of the door being shown open; Fig. 2 is an end view of the same; Fig. 3 is a vertical longitudinal sectional view taken through the door; Fig. 4 is a vertical transverse sectional view on the line 4—4 of Fig. 1; Fig. 5 is a similar view on the line 5—5 of Fig. 1; and Fig. 6 is a similar view on the line 6—6 of Fig. 1.

Referring more particularly to the drawings, 1 denotes the crate which is here shown as constructed of slats, but which may be formed of any suitable material. The crate consists of a top, 2, sides, 3, ends, 4, and a bottom, 5.

The sides, 3, of the crate are preferably in the form of oblong frames, the lower side pieces, 6, of which project below the bottom, 5, and form runners upon which the crate may be drawn over the ground and by means of which the floor or bottom of the crate is held above the ground or surface upon which the crate rests, thus protecting the bottom against wear and breakage. The sides, 3, are connected together at each end by upper and lower cross pieces, 7, to which the end slats are secured to form the ends, 4, of the crate. To the lower cross piece, 7, is nailed or otherwise secured the opposite ends of the floor boards which form the bottom, 5.

To the upper cross piece, 7, of the ends are secured the opposite ends of the top slats, 8, which form the top of the crate, said slats being further held at their ends by cross slats, 9, as shown. The slats 8 are supported midway between their ends by upper and lower cross strips 10, between which said strips are secured at suitable distances apart. At a suitable position in the top, 2, one of the slats, 12, is loose and extends only part way across the crate, said slat ending a short distance beyond the supporting strips, 10, as shown at 13. To the opposite or outer end of the slat, 12, are secured upper and lower parallel transversely disposed guide cleats, 14, which are of sufficient length to engage the next adjacent slats, 8, on each side of the slat, 12, and thereby slidably support this end of said slat, the opposite end of the same being slidably supported between the cross pieces, 10. On each side of the slat, 12, and slidably mounted between the same and the adjacent slats, 8, are short slats, 15, which form the opposite end of the door. The outer end of the slats, 15, normally engage the end cross bars, 7, and strips, 9, and said ends of the slats, 15, are held in position and slidably supported on the adjacent slats, 8, by by parallel transversely disposed guide cleats 16, which are secured to said ends of the slats, 15, and project across the adjacent slats, 8, as shown. The opposite or inner ends of the slats, 15, are connected together by a cleat, 17, which passes beneath and slidably engages the under side of the slat, 12. The slats, 15, slide between the cross pieces, 10, and are supported at their inner ends by said pieces.

Secured to the inner end of the slat, 12, on its under side is one end of a coiled door closing spring, 18, which is arranged below or in engagement with the under side of the slat, 12, and passes below the lower cross strip, 10, and is secured at its opposite end to the cross cleat, 17, which secures the inner ends of the slats, 15, together. The tension of the spring 18 when thus arranged is exerted to force the slats, 12 and 15 outwardly and to hold the outer ends of the same in engagement with the pieces 7 and 9 on the opposite ends of the top slats, thus closing both ends of the door. When it is desired to open the end of the door formed by the slat, 12, said slat is pushed inwardly or toward the opposite end of the crate against the tension of the spring, 18, which will serve to increase the tension of the spring and thereby more firmly hold the slats 15 in a closed position against the opposite end of the crate. As soon as the slat 12 is released, the same will be drawn to a closed position by the spring. In the same manner when it is desired to open the door at the opposite end of the crate, the slats, 15, are moved inwardly or toward the opposite end of the crate, thereby stretching the spring in the opposite direction and causing the tension of the same to be exerted in more firmly holding the slat, 12, in closed position.

In order that the sides of the crate may be firmly braced, I provide a suitable bracing mechanism comprising upper and lower wire rods, 19 and 20. The opposite ends of the upper rod, 19, are passed around the outer edges and upper sides of the upper strips of the side pieces 3, adjacent to the outer sides of the end pieces, said ends of the rods being then passed downwardly across the inner edge of the upper strips of the side pieces, after which they are passed around and twisted or otherwise secured to the adjacent ends of the upper cross piece, 7, of the ends of the crate as shown at 21. The lower rod 20 has its ends passed around the projecting ends of the lower side pieces 6 and secured to the lower cross pieces, 7, of the ends of the crate as shown at 22. The central or loop portions of the rods, 19 and 20, are then brought together and twisted as shown at 23, thereby stretching said rods and holding the sides and ends of the crate in rigid engagement.

A crate constructed as herein shown and described will be strong and durable and will effectually resist the rough use to which such crates are subjected, and by providing a door for the same constructed as herein shown, the fowls may be readily removed from either end of the crate, and when the door at one end is opened, the door at the opposite end will be closed, thus preventing the escape of the fowls from this end.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:

1. In a crate of the character described, a door arranged in the upper side thereof, said door being constructed of spring projected sections whereby when the section at one end of the crate is opened, the section at the opposite end will be held in closed position, substantially as described.

2. In a crate, a door formed of slidably engaged sections, a spring connected to said sections whereby they are projected in opposite directions to close both sections of the door, and means to slidably support said sections on the crate, substantially as described.

3. In a crate, a door formed in sections to close both ends of an opening formed in the crate, one of said sections comprising a slat and the opposite section a pair of slats slidably engaged with the opposite sides of the slat forming the other section, means to support said slats in slidable engagement with the crate, and a spring connected at its opposite ends to the inner ends of said slatted sections whereby the latter are forced outwardly to closed position, substantially as described.

4. In a crate, a door formed in sections to close both ends of an opening formed in the crate, one of said sections comprising a slat and the opposite section a pair of slats slidably engaged with the opposite sides of the slat forming the other section, transversely disposed guide cleats secured to the outer ends of said slatted door sections and adapted to slidably engage the adjacent portions of the crate whereby said ends of the door sections are supported in operative position, cross strips arranged on the crate to support the inner ends of said slatted sections, and a spring connected at its opposite ends to the inner ends of said slatted sections whereby they are normally projected to their closed position, substantially as described.

In testimony whereof I have hereunto set my hand in presence of two subscribing witnesses.

DANIEL TURNER.

Witnesses:
GEO. NEWE,
M. H. COLLINS.